United States Patent
Besaw (10) Patent No.: US 6,986,518 B1
(45) Date of Patent: Jan. 17, 2006

(54) COMBINED BABY CAR SEAT AND STROLLER

(76) Inventor: Gary Lee Besaw, 5086 Lapeer Rd., Burton, MI (US) 48509

( * ) Notice: Subject to any disclaimer, the term of this patent is extended or adjusted under 35 U.S.C. 154(b) by 64 days.

(21) Appl. No.: 10/724,468

(22) Filed: Dec. 1, 2003

(51) Int. Cl.
B62B 7/12 (2006.01)

(52) U.S. Cl. ............... 280/30; 280/47.38; 280/648; 280/650

(58) Field of Classification Search .......... 280/30, 280/31, 439, 642, 646, 647, 648, 650, 658, 280/47.38, 639, 651; 297/183.1, 183.2, 183.3, 297/183.4, 183.5, 353, 354.1
See application file for complete search history.

(56) References Cited

U.S. PATENT DOCUMENTS

| | | | | |
|---|---|---|---|---|
| 2,645,502 A | * | 7/1953 | Collins et al. | 280/31 |
| 2,720,911 A | * | 10/1955 | Lantz | 280/30 |
| 4,019,751 A | * | 4/1977 | Nakao | 280/31 |
| 4,345,791 A | * | 8/1982 | Bryans et al. | 297/256.14 |
| 4,537,414 A | | 8/1985 | Nusbaum | |
| 4,685,688 A | | 8/1987 | Edwards | |
| 4,733,909 A | * | 3/1988 | Single et al. | 297/256.13 |
| 4,762,331 A | * | 8/1988 | Tucker et al. | 280/30 |
| 4,762,364 A | * | 8/1988 | Young | 297/256.12 |
| 4,852,894 A | * | 8/1989 | Dyer | 280/30 |
| 4,872,693 A | | 10/1989 | Kennel | |
| 4,878,680 A | | 11/1989 | Molnar | |
| 4,902,026 A | * | 2/1990 | Maldonado | 280/30 |
| D310,054 S | * | 8/1990 | Tucker et al. | D12/129 |
| 4,989,888 A | * | 2/1991 | Qureshi et al. | 280/30 |
| 5,104,134 A | * | 4/1992 | Cone | 280/30 |
| 5,149,133 A | | 9/1992 | Alvarado | |
| 5,188,380 A | * | 2/1993 | Tucek | 280/30 |
| 5,230,523 A | * | 7/1993 | Wilhelm | 280/30 |
| 5,395,154 A | * | 3/1995 | Wang | 297/130 |
| 5,431,478 A | * | 7/1995 | Noonan | 297/130 |
| 5,595,393 A | * | 1/1997 | Batten | 280/30 |
| 5,803,535 A | * | 9/1998 | Jane Cabagnero | 297/183.3 |
| 6,161,847 A | * | 12/2000 | Howell et al. | 280/30 |
| 6,237,995 B1 | * | 5/2001 | Dierickx | 297/130 |
| 6,367,821 B2 | * | 4/2002 | Thiele | 280/30 |
| 6,594,840 B2 | * | 7/2003 | Tomas et al. | 5/655 |
| 6,729,630 B2 | * | 5/2004 | Szmidt et al. | 280/47.25 |
| 6,854,744 B2 | * | 2/2005 | Brandler | 280/30 |

* cited by examiner

Primary Examiner—Christopher P. Ellis
Assistant Examiner—Kelly E Campbell (57) ABSTRACT

A combined baby car seat and stroller includes a base member removably attachable to the seat of an automobile and a seat member removably engageable and lockable with the base member. The seat member includes a hide-away canopy connected thereto and a plurality of wheels connected to the bottom portion thereof for allowing the seat member to be rolled on a surface. The device further includes an elongated carry handle connected to select ones of the plurality of wheels and a telescopic member connected to the seat member and extendable outwardly and away therefrom for aiding an operator in advancing the seat member when removed from the base member. The device further includes a foot lever and a rocker member positioned below the plurality of wheels so that the seat member can be oscillated along an arcuate path. The seat member may be reclined for convenient travel sleeping.

18 Claims, 6 Drawing Sheets

COMBINED BABY CAR SEAT AND STROLLER

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to a child seating device and, more particularly, to a multi-functional, combination child's car seat, carrier, stroller, rocker and travel sleeper.

2. Prior Art

In recent years, the law has required child safety car seats for babies and small children when riding in an automobile. Such seats are designed to withstand impacts such as when an automobile is involved in an accident. When a baby is taken by car to a destination, it is frequently desirable to then place the baby in a stroller for further transportation. To do so, the baby must be lifted from the car seat and placed in the stroller. If the baby has fallen asleep in the car seat, movement from the car seat into the stroller frequently results in awakening the baby. Carrying a child seated in a car seat can be difficult for the average size person, grandparents, or people with back problems or other ailments. Similarly, if the baby has fallen asleep in the stroller and it comes time to place the baby in its car seat, the baby will be disturbed.

Thus, the average family faces the prospect of having to transport both a car seat and a stroller for each small child. This is particularly troublesome for families with two or more small children. In view of the fact that the size of the average car is continuously decreasing, due to efforts to increase fuel efficiency, the amount of available storage space is frequently limited. This is particularly true when the average family takes an extended trip by automobile and must also transport luggage in the car. A need to carry both a car seat and a stroller on such excursions is burdensome and may be difficult in small cars.

An additional problem is the time and effort required to transfer a child from the car seat to the stroller and vice versa. This is particularly cumbersome in certain common situations, for example where the weather is bad, where the child is sleeping and/or where a number of frequent stops must be made, such as on a local shopping trip.

Accordingly, a need remains for a combination infant car seat and stroller that is stable, safe, and easily maneuverable.

BRIEF SUMMARY OF THE INVENTION

In view of the foregoing background, it is therefore an object of the present invention to provide a device that enables an infant car seat to be converted to use as a stroller when the infant is removed from the car. These and other objects, features, and advantages of the invention are provided by a combined baby car seat and stroller including a base member removably attachable to the seat of an automobile and having front and rear portions including a plurality of slots for receiving a seat belt therethrough so that the base member can be attached to a car seat with either the rear or front portions facing forwardly.

The base member further includes a seat release lever disposed adjacent the back portion thereof and a seat member including a bottom portion and a front portion connected thereto. The seat member is removably engageable and lockable with the base member so that an infant can be safely supported therein during operating conditions. The bottom and back portions include respective padded members for providing comfort to an infant seated thereon.

The seat member is removable from the base member when the seat release lever is activated. The seat member further includes a plurality of harness slots formed at the bottom and back portions and a chest harness attachable to the seat member and selectively positionable through select ones of the plurality of harness slots so that a length of the harness can be selectively adjusted. A plurality of release buttons operably attached to the harness allow an operator to quickly and effectively remove a passenger from the car seat.

The device further includes a plurality of wheels connected to the bottom portion of the seat member and for allowing the seat member to be rolled on a surface after being removed from the base member. An elongated carry handle having oppositely spaced lower end portions is connected to select ones of the plurality of wheels and extends upwardly therefrom to a predetermined height. The carry handle allows an operator to carry the car seat without having to bend over. A grip pad preferably formed from rubber material is connected to the carry handle for assisting an operator to maintain a secure grip while transporting the car seat.

The device further includes a telescopic handle member spaced from the carry handle and disposed substantially medially thereof. The telescopic handle member is connected to the seat member and is extendable outwardly and away therefrom for allowing an operator to advance the car seat when removed from the base member. The telescopic handle includes at least one reflective material attached to both sides of the handle for providing visual notification at night.

The device further includes a mechanism for pivotally adjusting the bottom portion with the top portion so that the seat member can be selectively positioned between toddler (upright) or sleeper (reclined) positions. The pivotally connecting mechanism includes a plurality of elongated axles having oppositely spaced end portions disposed substantially between select ones of the plurality of wheels and connected thereto.

A plurality of cross bars are connected substantially medially between the oppositely spaced end portions of the plurality of axles and a plurality of seat hinges are connected to one of the plurality of axles and to the back portion of the seat member. An anti-collapse seat stop is molded into the bottom and back portions of the seat member to prevent the seat member from folding into a closed position and injuring a passenger seated thereon. The pivotally connecting mechanism further includes a slot and a pivot lever selectively movable therein for allowing the back portion to be positioned at three different angles to the bottom portion.

The device further includes a foot lever and a rocker member operably connected thereto. The rocker member has an arcuate bottom surface and is selectively positionable below the plurality of wheels via the foot lever so that the seat member can be oscillated along an arcuate path.

The device further includes a hide-away canopy connected to the seat member and a hinge disposed adjacent the bottom portion. The canopy is selectively movable between up and down positions about the hinge so that a passenger seated within the seat member can be protected from the environment. A canopy slot, disposed adjacent the top portion of the seat member, receives the canopy when same is moved to an up position. The device further includes a retractable footrest/sleeper to support the legs and feet of growing toddlers in the sleeper position disposed adjacent the bottom portion of the seat member and is movable between extended and retracted positions.

The device further includes a pouch attached to the back portion of the seat member and has a top opening for allowing a user to place diapers therein. A cup holder is preferably disposed forward of the carry handle and attached adjacent to the bottom portion of the seat member.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art.

The device of this invention is referred to generally in FIGS. 1–8 by the reference numeral 10 and is intended to provide a combined car seat and stroller. It should be understood that the device 10 may be used to transport infants, toddlers, and small children and should not be limited to only infants.

Figure 2:
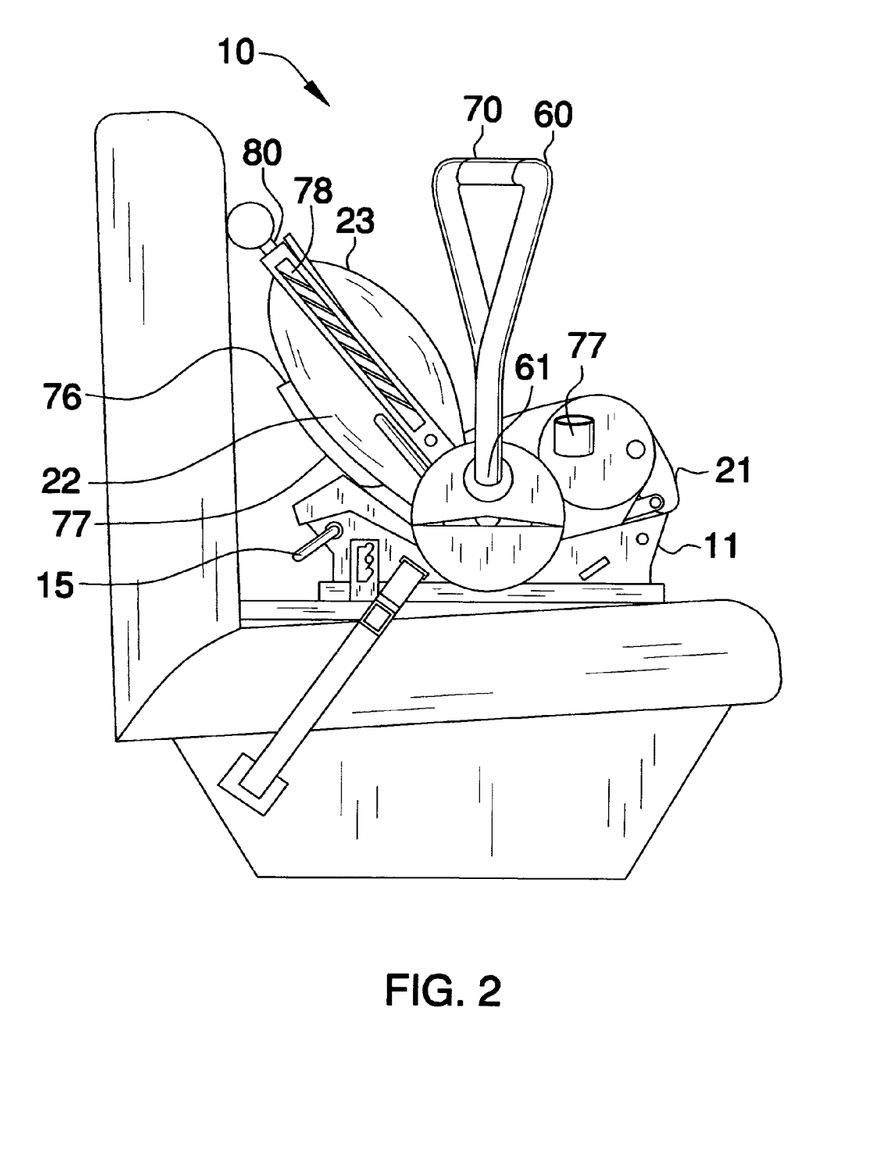
FIG. 2 is a side elevational view of the combined baby car seat and stroller, in accordance with the present invention.
Figure 3:
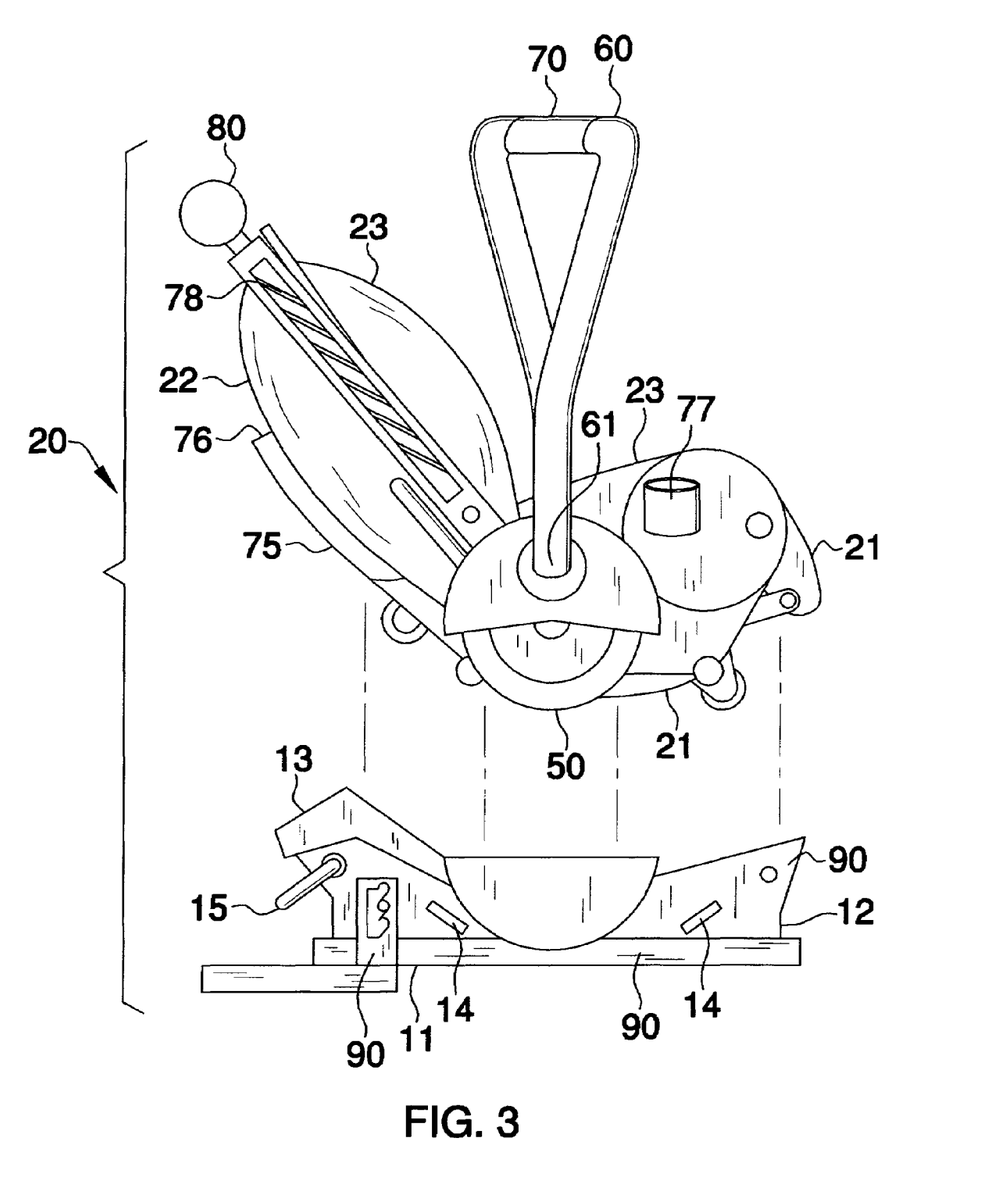
FIG. 3 is an enlarged view of FIG. 2 showing the seat member removed from the base member.

Referring to FIGS. 2 and 3, the device 10 includes a base member 11 removably attachable to the seat of an automobile and having front 12 and rear 13 portions including a plurality of slots 14 for receiving a seat belt therethrough so that the base member 11 can be attached to a car seat with either the rear 13 or front 12 portions facing forwardly. This ensures that the device 10 does not shift position during the many stops and starts associated with automobile operation and also prevents the device 10 from contacting the seat or dash in front of it in the event of a sudden stop such as in collisions or near collisions.

The base member 11 further includes a seat release lever 15 disposed adjacent the front portion 12 thereof and a seat member 20 including a bottom portion 21 and a back portion 22 connected thereto. This allows an operator to easily remove the seat member 20 from the base member 11 for transporting the seat member 20. Advantageously, the base member 11 is reversible to compensate for various shaped car seats and for various passengers.

Figure 1:
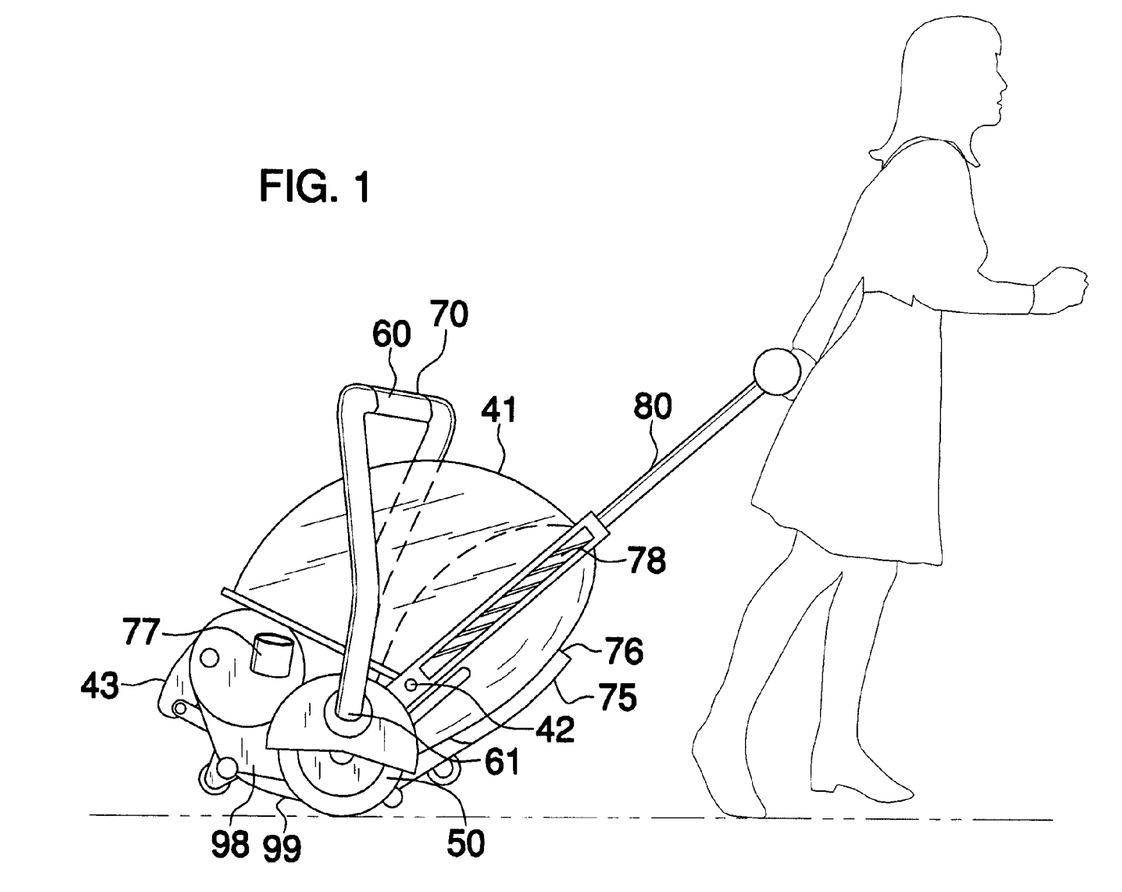
FIG. 1 is a side elevational view showing the present invention deployed in a preferred environment.
Figure 4:
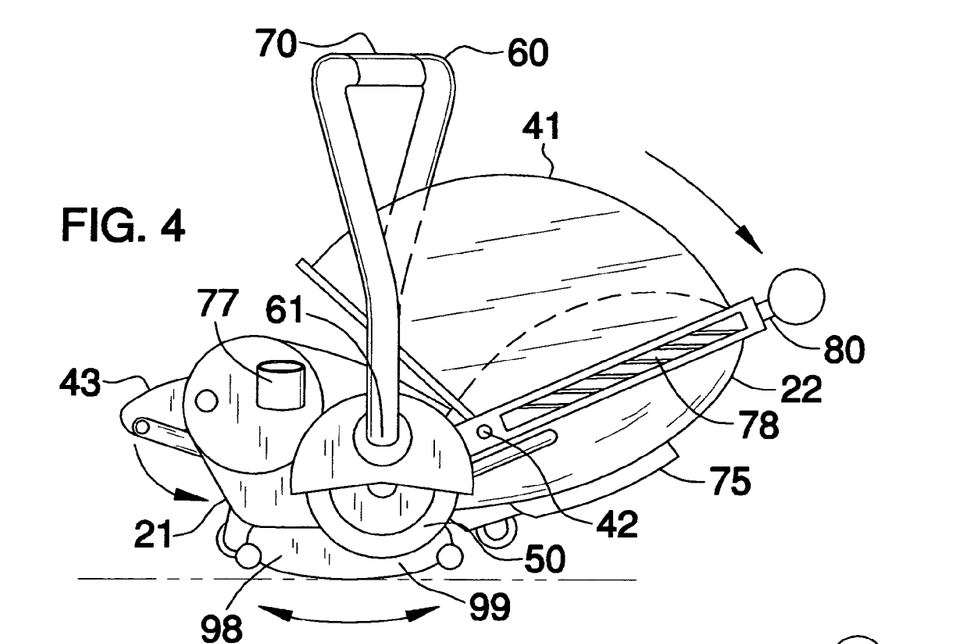
FIGS. 4–5 are side elevational views of the seat member when deployed as a rocker and a stroller, respectively.
Figure 5:
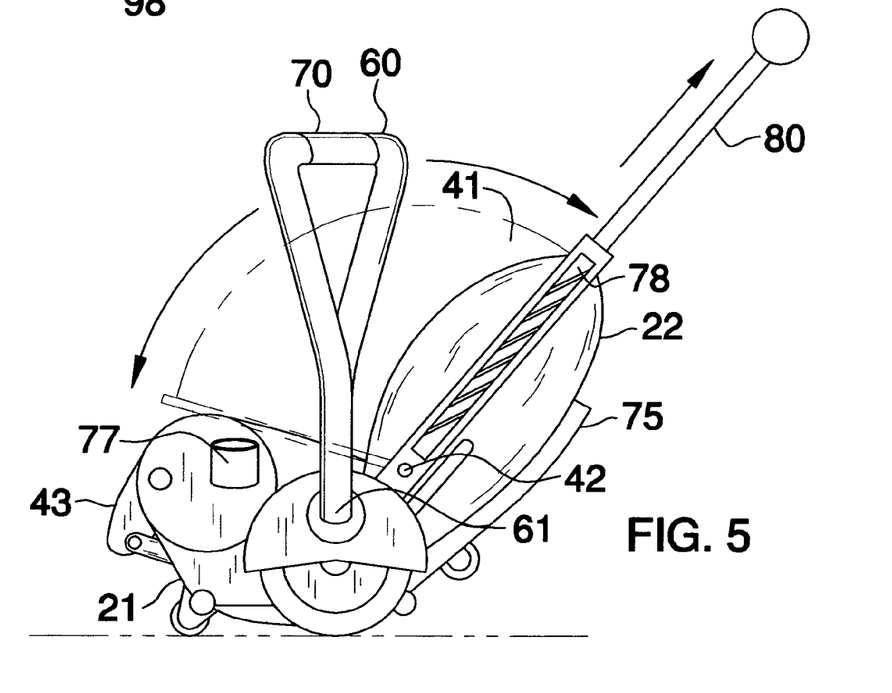

Now referring to FIGS. 1, 4, and 5, the device 10 further includes a hide-away canopy 41 connected to the seat member 20 and a hinge 42 disposed adjacent the bottom portion 21 thereof. The canopy 41 is selectively movable between up and down positions about the hinge 42 so that a passenger seated within the seat member 20 can be protected from the environment. The hinge 42 allows an operator to selectively position the canopy 41 to shade a passenger without reducing airflow anymore than necessary. A canopy slot 40, disposed adjacent the top portion 26 of the seat member 20, receives the canopy 41 when same is moved to an up position. The device 10 further includes a retractable footrest/sleeper 43 disposed adjacent the bottom portion 21 of the seat member 20 and is movable between extended and retracted positions. When the footrest/sleeper 43 is at a reclined position, it may be used as a traveling sleeper to support growing toddlers legs and feet with the car seat in a sleeping position.

Now referring back to FIG. 3, the seat member 20 is removably engageable and lockable with the base member 11 so that an infant can be safely supported therein during operating conditions. The bottom 21 and back 22 portions include respective padded members 23 for providing comfort to an infant seated thereon. The padded members 23 are preferably formed of memory foam having a machine washable and removable cover so that the inevitable soils and stains may be cleaned. The padded members 23 may be formed in a variety of designs and colors to better match the interior of an automobile. The seat member 20 is removable from the base member 11 when the seat release lever 15 is activated. Such a seat release lever is located on the back end of both sides of the base member for easy access on either side of the car. The lever 15 is preferably a double-action release lever or push button lever, as well known in the industry.

Figure 6:
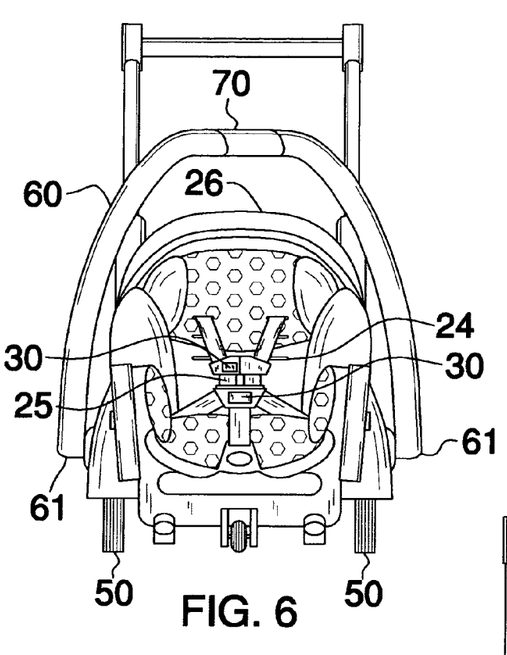
FIGS. 6–7 are front and rear elevational views of the seat member shown in FIG. 3.

Now referring to FIG. 6, the seat member 20 further includes a plurality of harness slots 24 formed at the bottom 21 and back 22 portions and a chest harness 25 is attachable to the seat member 20 and selectively positionable through select ones of the plurality of harness slots 24 so that a length of the harness 25 can be adjusted. This allows the harness 25 to fit snugly around passengers of different sizes, or to accommodate one single passenger as he/she grows. The harness 25 ensures that a passenger is securely fastened to the seat member 20 for safety reasons.

Advantageously, a plurality of release buttons 30 operably attached to the harness 25 allow an operator to quickly and effectively remove a passenger from the car seat. This especially important in the event of an accident where it is necessary to quickly remove a passenger from the seat member 20.

Figure 7:
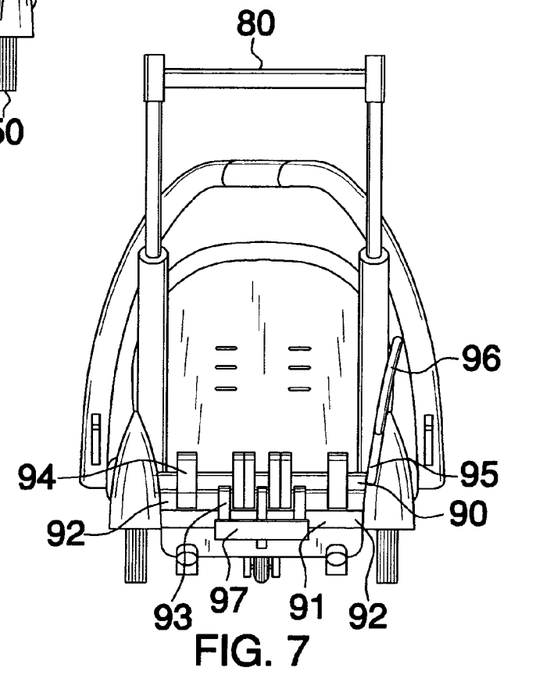

Now referring to FIG. 7, the device 10 further includes a plurality of wheels 50 connected to the bottom portion 21 of the seat member 20 for allowing the seat member 20 to be rolled on a surface after being removed from the base member 11. An elongated carry handle 60 having oppositely spaced lower end portions 61 is connected to select ones of the plurality of wheels 50 and extending upwardly therefrom to a predetermined height. The carry handle 60 allows an operator to carry the car seat without having to bend over. A grip pad 70 preferably formed from rubber material is connected to the carry handle 60 for assisting an operator to maintain a secure grip while transporting the car seat.

The device 10 further includes a telescopic handle member 80 spaced from the carry handle 60 and disposed substantially medially thereof. The telescopic handle member 80 is connected to the seat member 20 and is extendable outwardly and away therefrom for allowing an operator to advance the car seat when removed from the base member 11. The telescopic handle 80 preferably includes at least one reflective material 78 attached to both sides of the telescopic handle 80 for providing visual notification at night.

Figure 8:
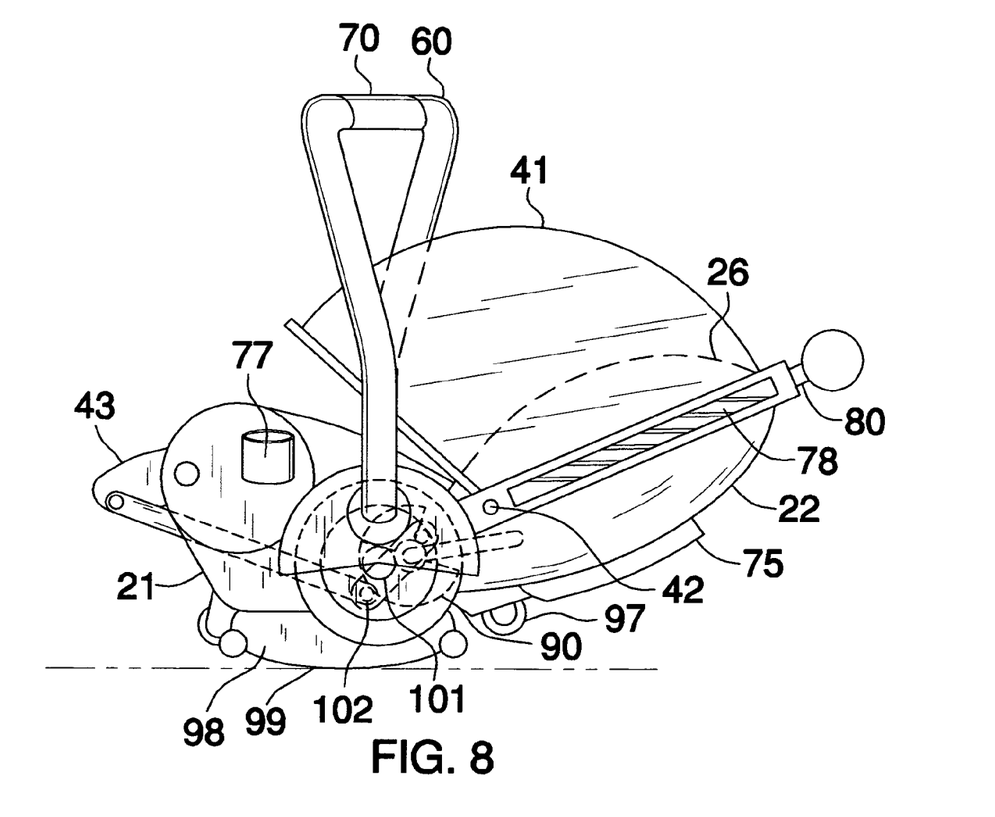
FIG. 8 is a side elevational view of the seat member shown in FIG. 4 and outlining the pivotally connecting mechanism.

Now referring to FIG. 8, the device 10 further includes a mechanism 90 for pivotally adjusting the bottom portion 21 with the top portion 26 so that the seat member 20 can be selectively positioned between upright and reclined positions. An elongated large hinge 102 is molded or welded to the seat and back, surrounding a hardened, steel, and stiff pin. An anti-collapse seat stop 101 is molded into the bottom 21 and back 22 portions of the seat member 20 to prevent same from folding into a closed position and injuring a passenger seated thereon. The pivotally connecting mechanism 90 includes a plurality of elongated axles 91 having oppositely spaced end portions 92 disposed substantially between select ones of the plurality of wheels 50 and connected thereto as perhaps best shown in FIG. 7.

Now referring back to FIG. 7, a plurality of cross bars 93 are connected substantially medially between the oppositely spaced end portions 92 of the plurality of axles 91, and a plurality of seat hinges 94 are connected to one of the plurality of axles 91 and to the back portion 22 of the seat member 20. The pivotally connecting mechanism 90 further includes a slot 95 and a pivot lever 96 selectively movable therein for allowing the back portion 22 to be positioned at various angles to the bottom portion 21. Advantageously, this allows an operator to position the back portion 22 in a reclined position where an infant can sleep more comfortably. For example, the seat may be moved between an upright or toddler position, a tilted back or infant position to support the large head and neck of an infant, and a fully reclined position for convenient traveling or overnight sleeping.

Now referring back to FIG. 8, the device 10 further includes a foot lever 97 and a rocker member 98 operably connected thereto. The rocker member 98 has an arcuate bottom surface 99 and is selectively positionable below the plurality of wheels 50 via the foot lever 97 so that the seat member 20 can be oscillated along an arcuate path, thereby allowing an operator to rock the infant to sleep.

Now referring back to FIG. 1, the device 10 preferably further includes a pouch 75 attached to the back portion 22 of the seat member 20 and having a top opening 76 for allowing a user to place diapers therein. A cup holder 77 is preferably disposed forward of the carry handle 60 and attached adjacent to the bottom portion 21 of the seat member 20.

The appealing features of the device 10 are its multi-functionality, practicality, versatility, convenience, and ease of use. By combining a car seat, stroller, rocker and sleeper into one unit, parents would not have to rely on bulky full-size strollers when transporting their child outside the automobile and eliminates the need to transfer the child from one device to another.

Additionally, parents would not have to attempt to carry a child in a heavy, bulky carrier because a stroller was not available and he/she could more easily run errands without straining their backs or suffering other physical discomfort or fatigue. The diaper pouch and cup holder are built-in, making it easier for parents to bring along everything needed to care for the child without carrying separate bags. This enables parents to keep one hand free while operating the stroller, allowing them to hold the hand of a toddler, for example.

The device 10 is quick and easy to convert, and is safe and durable. It would be particularly appealing to parents traveling on public transportation with their children. When traveling by bus or train, the device 10 converts from a car seat to stroller accessory. When traveling by air, the device 10 eliminates the need to pack both a car seat and a stroller, and allows a child to remain seated until ready to be seated in an airplane seat. This allows parents to better handle and transport their own baggage. Furthermore, for parents that have limited income, the device 10 is suitable for both infants and toddlers so that a parent would not have to buy another car seat as the infant grows. By simply turning the seat and base member around to face the front of the car and putting the seat in the upright "toddler position", the device 10 is transformed into a car seat.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed is:

1. A combined baby car seat and stroller comprising:
   a base member removably attachable to the seat of an automobile, said base member having front and rear portions including a plurality of slots for receiving a seat belt therethrough so that said base member can be attached to a car seat with either said rear or front portions facing forwardly, said base member further including a seat release lever disposed adjacent said back portion thereof;
   a seat member including a bottom portion and a front portion connected thereto, said seat member being removably engageable and lockable with said base member so that an infant can be safely supported therein during operating conditions, said bottom and back portions including respective padded members for providing comfort to an infant seated thereon, said seat member being removable from said base member when said seat release lever is activated;
   a plurality of wheels connected to said bottom portion of said seat member and for allowing said seat member to be rolled on a surface after being removed from said base member;
   an elongated carry handle having oppositely spaced lower end portions connected to select ones of said plurality of wheels and extending upwardly therefrom to a predetermined height, said carry handle for allowing an operator to carry said car seat without having to bend over;

a telescopic handle member spaced from said carry handle and disposed substantially medially thereof, said telescopic handle member being connected to said seat member and being extendable outwardly and away therefrom for allowing an operator to advance said car seat when removed from said base member;

means for pivotally adjusting said bottom portion with said top portion so that said seat member can be selectively positioned between upright and reclined positions; and a foot lever and a rocker member operably connected thereto, said rocker having an arcuate bottom surface and being selectively positionable below said plurality of wheels via said foot lever so that said seat member can be oscillated along an arcuate path.

2. The combined baby car seat and stroller of claim 1, further comprising:

a canopy connected to said seat member and including a hinge disposed adjacent said bottom portion, said canopy being selectively movable between up and down positions about said hinge so that a passenger seated within said seat member can be protected from the environment.

3. The combined baby car seat and stroller of claim 1, further comprising:

a retractable foot rest disposed adjacent said bottom portion of said seat member and being movable between extended and retracted sleeper positions.

4. The combined baby car seat and stroller of claim 1, further comprising:

a grip pad connected to said carry handle and being formed from rubber material, said grip pad for assisting an operator to maintain a secure grip while transporting said car seat.

5. The combined baby car seat and stroller of claim 1, wherein said connecting means comprises:

a plurality of elongated axles having oppositely spaced end portions disposed substantially between select ones of said plurality of wheels and connected thereto;

a plurality of cross bars connected substantially medially between said oppositely spaced end portions of said plurality of axles;

a plurality of seat hinges connected to one said plurality of axles and to said back portion of said seat member; and a slot and a pivot lever selectively movable therein and for allowing said back portion to be positioned at various angles to said bottom portion.

6. The combined baby car seat and stroller of claim 1, wherein said seat member further comprises:

a plurality of harness slots formed at said bottom and back portions;

a chest harness attachable to said seat member and selectively positionable through select ones of said plurality of harness slots so that a length of said harness can be adjusted;

a plurality of release buttons operably attached to said harness for allowing an operator to quickly and effectively remove a passenger from said car seat; and a canopy slot disposed adjacent said top portion of said seat member and for receiving said canopy when same is moved to an up position.

7. A combined baby car seat and stroller comprising:

a base member removably attachable to the seat of an automobile, said base member having front and rear portions including a plurality of slots for receiving a seat belt therethrough so that said base member can be attached to a car seat with either said rear or front portions facing forwardly, said base member further including a seat release lever disposed adjacent said back portion thereof;

a seat member including a bottom portion and a front portion connected thereto, said seat member being removably engageable and lockable with said base member so that an infant can be safely supported therein during operating conditions, said bottom and back portions including respective padded members for providing comfort to an infant seated thereon, said seat member being removable from said base member when said seat release lever is activated;

a plurality of wheels connected to said bottom portion of said seat member and for allowing said seat member to be rolled on a surface after being removed from said base member;

an elongated carry handle having oppositely spaced lower end portions connected to select ones of said plurality of wheels and extending upwardly therefrom to a predetermined height, said carry handle for allowing an operator to carry said car seat without having to bend over;

a telescopic handle member spaced from said carry handle and disposed substantially medially thereof, said telescopic handle member being connected to said seat member and being extendable outwardly and away therefrom for allowing an operator to advance said car seat when removed from said base member;

means for pivotally adjusting said bottom portion with said top portion so that said seat member can be selectively positioned between upright and reclined positions; and a foot lever and a rocker member operably connected thereto, said rocker having an arcuate bottom surface and being selectively positionable below said plurality of wheels via said foot lever so that said seat member can be oscillated along an arcuate path.

8. The combined baby car seat and stroller of claim 7, further comprising:

a canopy connected to said seat member and including a hinge disposed adjacent said bottom portion, said canopy being selectively movable between up and down positions about said hinge so that a passenger seated within said seat member can be protected from the environment.

9. The combined baby car seat and stroller of claim 7, further comprising:

a retractable foot rest disposed adjacent said bottom portion of said seat member and being movable between extended and retracted sleeper positions.

10. The combined baby car seat and stroller of claim 7, further comprising:

a grip pad connected to said carry handle and being formed from rubber material, said grip pad for assisting an operator to maintain a secure grip while transporting said car seat.

11. The combined baby car seat and stroller of claim 7, wherein said pivotally connecting means comprises:

a plurality of elongated axles having oppositely spaced end portions disposed substantially between select ones of said plurality of wheels and connected thereto;

a plurality of cross bars connected substantially medially between said oppositely spaced end portions of said plurality of axles;

a plurality of seat hinges connected to one said plurality of axles and to said back portion of said seat member; and a slot and a pivot lever selectively movable therein and for allowing said back portion to be positioned at various angles to said bottom portion.

12. The combined baby car seat and stroller of claim 7, wherein said seat member further comprises:

a plurality of harness slots formed at said bottom and back portions;

a chest harness attachable to said seat member and selectively positionable through select ones of said plurality of harness slots so that a length of said harness can be adjusted;

a plurality of release buttons operably attached to said harness for allowing an operator to quickly and effectively remove a passenger from said car seat; and a canopy slot disposed adjacent said top portion of said seat member and for receiving said canopy when same is moved to an up position.

13. A combined baby car seat and stroller comprising:

a base member removably attachable to the seat of an automobile, said base member having front and rear portions including a plurality of slots for receiving a seat belt therethrough so that said base member can be attached to a car seat with either said rear or front portions facing forwardly, said base member further including a seat release lever disposed adjacent said back portion thereof;

a seat member including a bottom portion and a front portion connected thereto, said seat member being removably engageable and lockable with said base member so that an infant can be safely supported therein during operating conditions, said bottom and back portions including respective padded members for providing comfort to an infant seated thereon, said seat member being removable from said base member when said seat release lever is activated;

a plurality of wheels connected to said bottom portion of said seat member and for allowing said seat member to be rolled on a surface after being removed from said base member;

an elongated carry handle having oppositely spaced lower end portions connected to select ones of said plurality of wheels and extending upwardly therefrom to a predetermined height, said carry handle for allowing an operator to carry said car seat without having to bend over;

a telescopic handle member spaced from said carry handle and disposed substantially medially thereof, said telescopic handle member being connected to said seat member and being extendable outwardly and away therefrom for allowing an operator to advance said car seat when removed from said base member;

means for pivotally adjusting said bottom portion with said top portion so that said seat member can be selectively positioned between upright and reclined positions;

a foot lever and a rocker member operably connected thereto, said rocker having an arcuate bottom surface and being selectively positionable below said plurality of wheels via said foot lever so that said seat member can be oscillated along an arcuate path; and a canopy connected to said seat member and including a hinge disposed adjacent said bottom portion, said canopy being selectively movable between up and down positions about said hinge so that a passenger seated within said seat member can be protected from the environment.

14. The combined baby car seat and stroller of claim 13, further comprising:

a retractable foot rest disposed adjacent said bottom portion of said seat member and being movable between extended and retracted sleeper positions.

15. The combined baby car seat and stroller of claim 13, further comprising:

a grip pad connected to said carry handle and being formed from rubber material, said grip pad for assisting an operator to maintain a secure grip while transporting said car seat.

16. The combined baby car seat and stroller of claim 13, wherein said pivotally connecting means comprises:

a plurality of elongated axles having oppositely spaced end portions disposed substantially between select ones of said plurality of wheels and connected thereto;

a plurality of cross bars connected substantially medially between said oppositely spaced end portions of said plurality of axles;

a plurality of seat hinges connected to one said plurality of axles and to said back portion of said seat member; and a slot and a pivot lever selectively movable therein and for allowing said back portion to be positioned at various angles to said bottom portion.

17. The combined baby car seat and stroller of claim 13, wherein said seat member further comprises:

a plurality of harness slots formed at said bottom and back portions;

a chest harness attachable to said seat member and selectively positionable through select ones of said plurality of harness slots so that a length of said harness can be adjusted;

a plurality of release buttons operably attached to said harness for allowing an operator to quickly and effectively remove a passenger from said car seat; and a canopy slot disposed adjacent said top portion of said seat member and for receiving said canopy when same is moved to an up position.

18. The combined baby car seat and stroller of claim 13, wherein said seat member further comprises:

a pouch attached to said back portion of said seat member and having a top opening for allowing a user to place diapers therein;

a cup holder attached adjacent to said bottom portion of said seat member, said cup holder being disposed forward of said carry handle; and at least one reflective material attached to both sides of said telescopic handle and for providing visual notification at night.

* * * * *